US008880256B2

(12) United States Patent
Heap et al.

(10) Patent No.: US 8,880,256 B2
(45) Date of Patent: Nov. 4, 2014

(54) METHOD AND APPARATUS FOR STATE SELECTION STABILIZATION FOR ELECTRIFIED POWERTRAINS

(75) Inventors: Anthony H. Heap, Ann Arbor, MI (US); Yaoyao Wei, Novi, MI (US); Kee Yong Kim, Ann Arbor, MI (US); Samantha Victoria Lado, Pittsfield Township, MI (US); John Janczak, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 79 days.

(21) Appl. No.: 13/571,061

(22) Filed: Aug. 9, 2012

(65) Prior Publication Data

US 2014/0046522 A1 Feb. 13, 2014

(51) Int. Cl.
*B60K 17/06* (2006.01)
(52) U.S. Cl.
USPC .............................. 701/22; 701/54
(58) Field of Classification Search
USPC ................................... 701/22, 54
See application file for complete search history.

(56) References Cited

U.S. PATENT DOCUMENTS

| 2005/0182546 A1* | 8/2005 | Hsieh et al. ............ 701/54 |
| 2007/0078580 A1* | 4/2007 | Cawthorne et al. ....... 701/51 |
| 2009/0118949 A1* | 5/2009 | Heap et al. ............. 701/55 |

* cited by examiner

*Primary Examiner* — Mary Cheung
*Assistant Examiner* — Yuen Wong

(57) ABSTRACT

A method for stabilizing selection between a plurality of operating range states of an electro-mechanical multi-mode transmission configured to transfer torque among an engine, at least one electric machine, and a driveline includes requesting operation of the transmission in a preferred operating range state while a shift from a first operating range state to a second operating range state is in progress prior to achieving the second operating range state. Powertrain information is monitored and compared to a driver perception threshold only if a change of mind condition is detected. The shift to the second operating range state is avoided and a shift to the preferred operating range state is commanded if the powertrain information does not violate the driver perception threshold.

12 Claims, 6 Drawing Sheets

METHOD AND APPARATUS FOR STATE SELECTION STABILIZATION FOR ELECTRIFIED POWERTRAINS

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion electric machines. The non-combustion electric machines may include electric machines that are operative as motors or generators to generate a torque input to the transmission independently of a torque input from the internal combustion engine. The electric machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Known transmission devices employ torque-transfer clutch devices to transfer torque between the engine, the electric machines and the driveline. Operation of a powertrain system includes activating and deactivating the clutches to effect operation in selected operating states.

SUMMARY

Method for stabilizing selection between a plurality of operating range states of an electro-mechanical multi-mode transmission configured to transfer torque between an engine, at least one electric machine, and a driveline includes requesting operation of the transmission in a preferred operating range state while a shift from a first operating range state to a second operating range state is in progress prior to achieving the second operating range state. Powertrain information is monitored and compared to a driver perception threshold only if a change of mind condition is detected. The shift to the second operating range state is avoided and a shift to the preferred operating range state is commanded if the powertrain information does not violate the driver perception threshold.

BRIEF DESCRIPTION OF THE DRAWINGS

One or more embodiments will now be described, by way of example, with reference to the accompanying drawings, in which.

DETAILED DESCRIPTION

Figure 1:
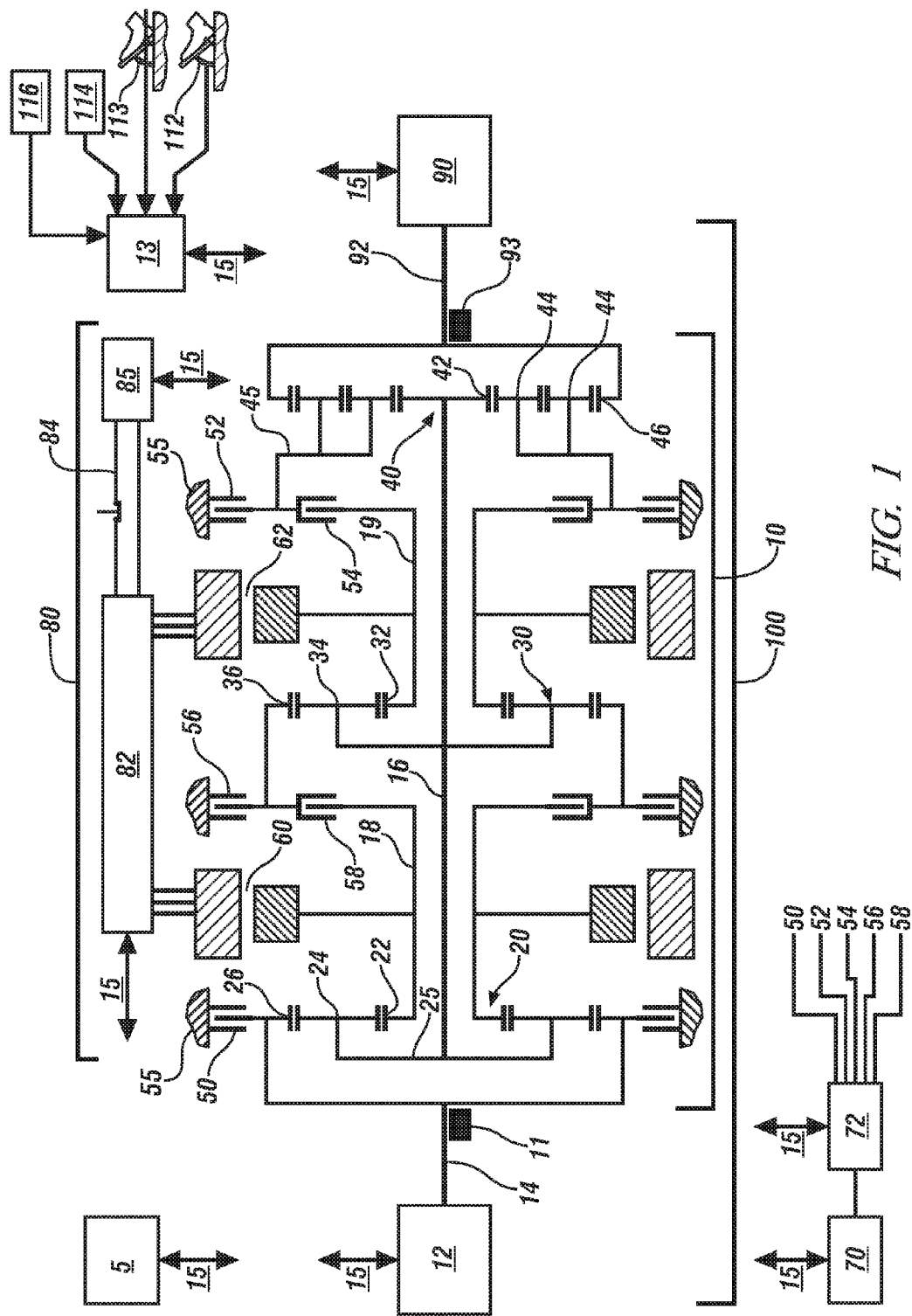
FIG. 1 illustrates a multi-mode powertrain system including an internal combustion engine, transmission, driveline, and a controller, in accordance with the present disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode electro-mechanical transmission (transmission) 10, a high-voltage electrical system 80, a driveline 90, and a control module 5. The transmission 10 mechanically couples to the engine 12 and first and second electric machines 60, 62, respectively, and is configured to transfer torque between the engine 12, the electric machines 60, 62, and the driveline 90. As illustrated, the first and second electric machines 60, 62 are electric motor/generators.

The high-voltage electrical system 80 includes an electrical energy storage device (ESD) 85 electrically coupled to a transmission power inverter control module (TPIM) 82 via a high-voltage electrical bus 84, and is configured with suitable devices for monitoring electric power flow including devices and systems for monitoring electric current and voltage. The ESD 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., rotational speed multiplied by engine torque, can differ from the input speed and the input torque to the transmission 10 due to placement of torque-consuming components on the input member 14 between the engine 12 and the transmission 10, e.g., a torque management device. The engine 12 is configured to execute autostop and autostart operations during ongoing powertrain operation in response to operating conditions. The control module 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second electric machines 60, 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second electric machines 60, 62, respectively. The transmission 10 is configured to transfer torque between the engine 12, the electric machines 60, 62, and the output member 92 in response to an output torque request. The first and second electric machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the control module 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the control module 5 to activate and deactivate the aforementioned clutches, provide hydraulic fluid for cooling and lubricating elements of the transmission, and provide hydraulic fluid for cooling the first and second electric machines 60 and 62. Hydraulic pressure in the hydraulic circuit 72 may be determined by measurement using pressure sensor(s), by estimation using on-board routines, or using other suitable methods.

The first and second electric machines 60, 62, respectively, are three-phase AC motor/generator machines, each including a stator, a rotor, and a resolver. The motor stator for each of the electric machines 60, 62 is grounded to an outer portion of the transmission case 55, and includes a stator core with coiled electrical windings extending therefrom. The rotor for the first electric machine 60 is supported on a hub plate gear that mechanically attaches to sleeve shaft 18 that couples to the first planetary gear set 20. The rotor for the second electric machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second electric machines 60, 62, respectively. Additionally, the signals output from the resolvers may be used to determine rotational speeds for first and second electric machines 60, 62, respectively.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second electric machines 60, 62, respectively, are generated as a result of energy conversion from fuel or electrical potential stored in the ESD 85. The ESD 85 is high voltage DC-coupled to the TPIM 82 via the high-voltage electrical bus 84 that preferably includes a contactor switch that permits or prohibits flow of electric current between the ESD 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 85 to AC power for powering respective ones of the first and second electric machines 60, 62, respectively, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 60, 62, respectively, for operation as motors or generators via transfer conductors. The TPIM 82 transfers electrical power to and from the first and second electric machines 60, 62, respectively, through the power inverters and respective motor control modules in response to the motor torque commands. Electrical current is transmitted across the high-voltage electrical bus 84 to and from the ESD 85 to charge and discharge the ESD 85.

The control module 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of ESD 85 and the first and second electric machines 60, 62, respectively. The control module 5 is a subset of an overall vehicle control architecture, and provides coordinated system control of the powertrain system. The control module 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of transmission ranges and engine states to generate and transfer torque to the driveline 90. The engine states include an on state, an off state, and a fuel cutoff state. When the engine operates in the off state, it is unfueled, not firing, and is not spinning. When the engine operates in the on state it is fueled, firing, and spinning. When the engine operates in the fuel cutoff state, it is spinning but is unfueled and not firing. The transmission ranges include a plurality of neutral (neutral), fixed gear (Gear #), variable mode (EVT Mode #), electric vehicle (EV#) and transitional (EV Transitional State# and Pseudo-gear #) ranges that are achieved by selectively activating the clutches C1 150, C2 152, C3 154, C4 156, and C5 158. A pseudo-gear range is a variable mode transmission range in which torque output from the transmission 10 corresponds to the input torque from the engine 12, taking into account torque losses associated with torque-consuming components on the input member 14. The pseudo-gear ranges are primarily employed as intermediate transmission ranges during shifts between EVT Mode ranges. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | on/off | | | | | |
| Neutral 2 | on/off | | | x | | |
| Neutral 3 | on/off | | | | x | |

TABLE 1-continued

| Range | Engine State | C1 | C2 | C3 | C4 | C5 |
|---|---|---|---|---|---|---|
| PseudoGear 1 | on/off | x | | | | |
| PseudoGear 2 | on/off | | x | | | |
| Neutral | off | | | | | x |
| EVT Mode 1 | on/off | x | | x | | |
| EVT Mode 2 | on/off | x | | | x | |
| EVT Mode 3 | on/off | | x | | x | |
| EVT Mode 4 | on/off | | x | x | | |
| EV Transitional State 1 | off | x | | | | x |
| EV Transitional State 2 | off | | x | | | x |
| Gear 1 | on | x | | x | x | |
| Gear 2 | on | x | x | | x | |
| Gear 3 | on | | x | x | x | |
| EV1 | off | x | | x | | x |
| EV2 | off | x | | | x | x |
| EV3 | off | | x | | x | x |
| EV4 | off | | x | x | | x |
| EV Transitional State 3 | off | x | x | | | x |
| Neutral | on/off | | | x | x | |
| PseudoGear 3 | on/off | x | x | | | |
| Neutral | off | | | x | | x |
| Neutral | off | | | | x | x |

Figure 2:
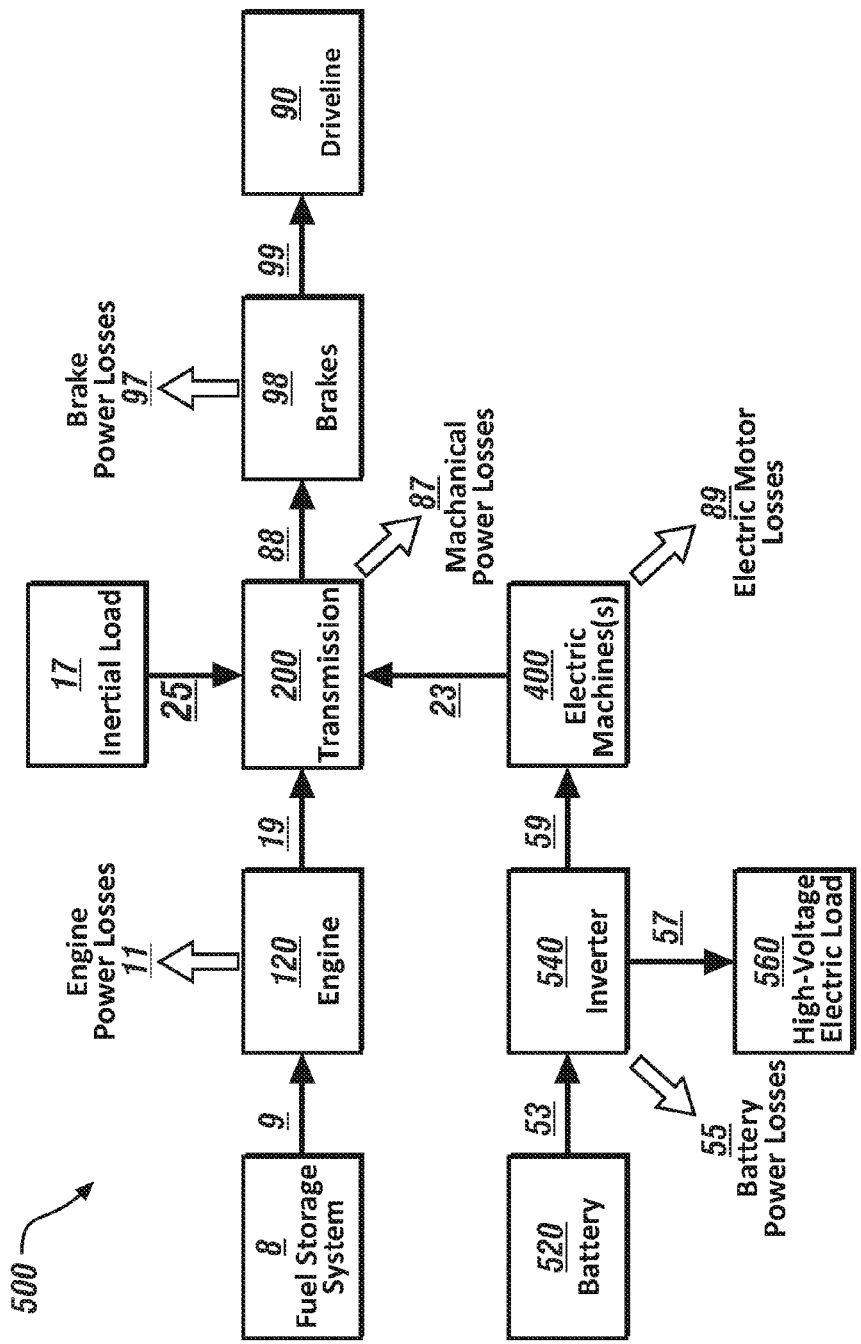
FIG. 2 illustrates an analytic framework for determining powertrain system operating costs for an exemplary power cost function 500, which is described with reference to the multi-mode powertrain system 100 of FIG. 1, in accordance with the present disclosure.

FIG. 2 schematically illustrates an analytic framework for determining powertrain system operating costs for an exemplary power cost function 500, which is described with reference to the multi-mode powertrain system 100 described with reference to FIG. 1. Powertrain elements include engine 120, transmission 200, non-combustion electric machine(s) 400, battery 520, inverter 540, wheel brakes 98, driveline 90, and a fuel storage system 8. Pseudo-elements include an inertial load 17, which is an element constructed to account for system inertias, and high-voltage electrical load 560, which is an element constructed to account for high-voltage loads in the vehicle outside that load used for the powertrain system 100. Power flow paths include a first power flow path 9 from the fuel storage system 8 to transfer fuel power to the engine 120, a second power flow path 19 between the engine 120 and the transmission 200, a third power flow path 53 between the battery 520 and the inverter 540, a fourth power flow path 57 between the inverter 540 and the high-voltage electrical load 560, a fifth power flow path 59 between the inverter 540 and the non-combustion electric machine(s) 400, a sixth power flow path 23 between the non-combustion electric machine(s) 400 and the transmission 20, a seventh power flow path 25 between the inertial load 17 and the transmission 200, an eighth power flow path 88 between the transmission 200 and the wheel brakes 98, and a ninth power flow path 99 between the wheel brakes 98 and the driveline 90. Power losses include engine power losses 11, battery power losses 55, mechanical power losses 87, electric motor losses 89, and brake power losses 97. A total power loss can include a sum of the engine power losses 11, the battery power losses 55, the mechanical power losses 87, electric motor losses 89 and brake power losses 97. The power cost inputs to the power cost function 500 are determined based upon factors related to vehicle drivability, fuel economy, emissions, and battery usage. Power costs are assigned and associated with fuel and electrical power consumption and are associated with a specific operating points of the multi-mode powertrain. Lower operating costs can be associated with lower fuel consumption at high conversion efficiencies, lower battery power usage, and lower emissions for each engine speed/load operating point, and take into account the candidate operating state of the engine 14. The power costs may include the engine power losses 11, electric motor power losses 89, battery power losses 55, brake power losses 97, and mechanical power losses 87 associated with operating the multi-mode powertrain at specific operating points for the engine 100 and the non-combustion electric machine(s) 400. Subjective costs can be monitored to include, but not limited to, torque request costs, battery state of charge costs and output speed costs. The power cost function 500 may be employed to determine a total cost for operating at a selected engine operating point over the range of engine operation. Accordingly, a total cost can include the sum of the subjective costs, engine power losses 11, the battery power losses 55, the mechanical power losses 87, the electric motor losses 89, and the brake power losses 97 at any given operating range state.

Figure 3:
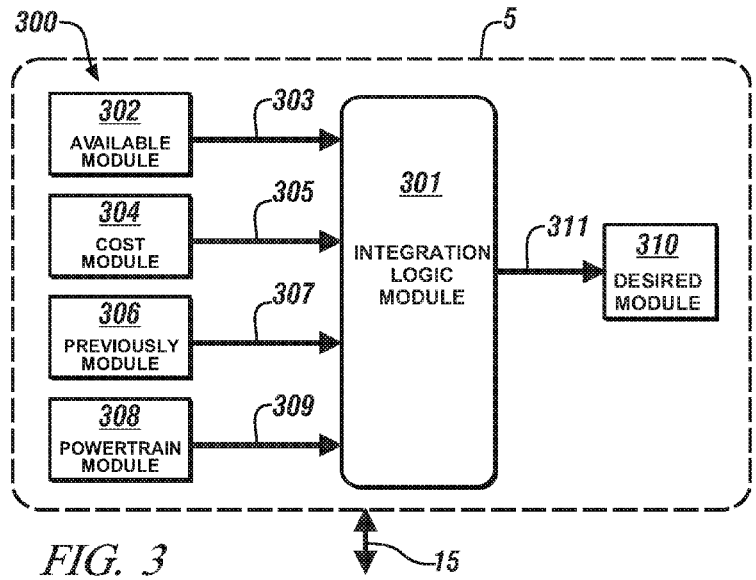
FIG. 3 illustrates a strategic range selection controller 300 for stabilizing selection between a plurality of operating range states of a multi-mode transmission, in accordance with the present disclosure.

FIG. 3 illustrates a strategic range selection controller 300 for stabilizing selection between a plurality of operating range states of a multi-mode transmission, in accordance with the present disclosure. An "operating range state" can include any transmission range or engine state depicted in Table 1. The strategic range selection controller 300 is integrated within the control module 5 of FIG. 1 and signally and operatively links to the various actuators and sensors in the powertrain system via the communications link 15. The strategic range selection controller 300 includes an integration logic module 301, an available operating range state module 302, a cost module 304, a previously desired operating range state module 306, a powertrain information module 308 and a desired operating range state module 310.

The available operating range state module 302 determines a plurality of available operating range states. With reference to Table 1, the plurality of operating of operating range states 301 are selected from the group consisting of: neutral states, fixed gear range states (Gears 1-3), variable mode range states (EVT modes 1-4) and electrical vehicle range states (EV 1-4). The cost module 304 monitors costs 305 for each of the operating range states of the powertrain system 100. The previously desired operating range state 306 monitors a previously desired operating range state 307 determined during a previous loop cycle. The powertrain information module 308 monitors powertrain information 309. The powertrain information 309 can include attained clutch states, an attained engine state, and an attained engine speed. The integration logic module 301 receives the plurality of available operating range states 303, the monitored power losses 305, the previously desired operating range state 307 and the monitored powertrain information 309. The integration logic module 301 determines a desired operating range state 311 that is input to the desired operating range state module 310. As will become apparent the integration logic module 301 stabilizes selection of operating states while avoiding over-stabilization in a currently selected operating range state. The integration logic module 301 can further be configured to command execution of a shift to a desired operating range state if the desired operating range state becomes available as an operating range state while a transmission shift to a previously desired operating range state is already in progress. As will be discussed in greater detail herein, when certain criteria is met, allowing the shift to the desired operating range state while the shift to the previously desired operating range state is already in progress reduces shift business and over-stabilization because completing the shift to the previously desired operating range state can be avoided.

Figure 4:
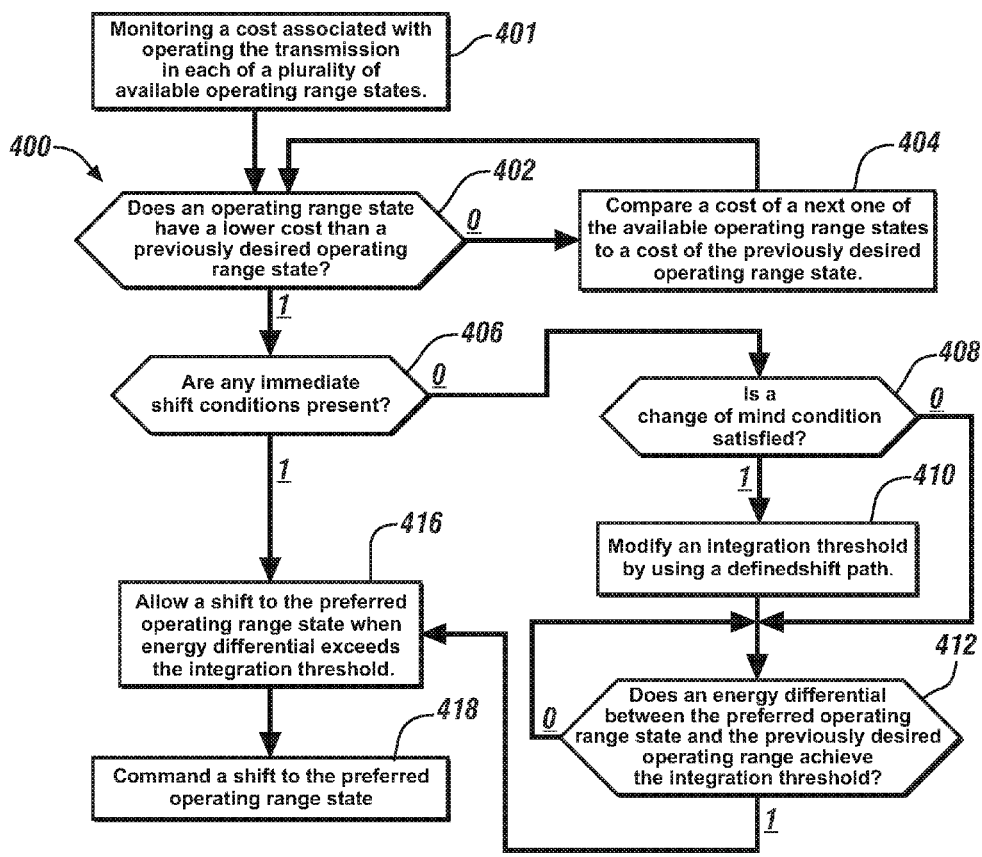
FIG. 4 illustrates a flowchart 400 utilizing the strategic range selection controller 300 of FIG. 3 for stabilizing selection between the plurality of operating range states of the multi-mode transmission, in accordance with the present disclosure.

FIG. 4 illustrates a flowchart 400 utilizing the strategic range selection controller 300 described with reference to FIG. 3 for stabilizing selection between the plurality of operating range states of the multi-mode transmission, in accordance with the present disclosure. As will become apparent when certain criteria are met, a shift to a desired operating range state can be requested if the desired operating range state suddenly becomes available as an operating range state while a transmission shift to a previously desired operating range state is already in progress. To provide clarity and consistency "a first operating range state" can correspond to a current or previously selected operating range state and "a second operating range state" corresponds to a previously desired operating range state. Table 2 is provided as a key to FIG. 4 wherein the numerically labeled blocks and the corresponding functions are set forth as follows.

TABLE 2

| BLOCK | BLOCK CONTENTS |
| --- | --- |
| 401 | Monitoring a cost associated with operating the transmission in each of a plurality of available operating range states. |
| 402 | Does an operating range state have a lower cost than a previously desired operating range state? |
| 404 | Compare a cost of a next one of the available operating range states to a cost of the previously desired operating range state. |
| 406 | Are any immediate shift conditions present? |
| 408 | Is a change of mind condition satisfied? |
| 410 | Modify an integration threshold by using a defined priority shift path. |
| 412 | Does an energy differential between the preferred operating range state and the previously desired operating range achieve the integration threshold? |
| 416 | Allow a shift to the preferred operating range state when energy differential exceeds the integration threshold |
| 418 | Command a shift to the preferred operating range state |

The flowchart 400 begins at block 401 and monitors a cost associated with operating the transmission in each of a plurality of operating range states in response to an operator torque request. The flowchart 400 proceeds to decision block 402 which determines if one of the operating range states is an available operating range state having a lower cost than a previously desired operating range state. A "1" indicates that one of the operating range states is a preferred operating range state having a lower cost than the previously desired operating range state and the flowchart proceeds to decision block 406. Hereinafter, an available operating range state having a lower cost that the previously desired operating range state is a "preferred" operating range state. A "0" indicates that available operating range states does not have a lower cost than the previously desired operating range state and the flowchart proceeds to block 404 which compares a next available operating range states to the cost of the previously desired operating range state and reverts back to decision block 402.

Decision block 406 determines if any immediate shift conditions are present. In an exemplary embodiment, an immediate shift condition is present if the previously desired operating range state becomes unavailable. In another exemplary embodiment, an immediate shift condition is present when the previously desired operating range state includes a neutral state and the available operating range states include a non-neutral state. A "1" indicates the immediate shift condition is detected and the flowchart 400 proceeds to block 416, wherein the transmission shift to the available operating range state is immediately requested. In other words, if the immediate shift condition is detected, integration logic employed for increasing transmission shift stabilization while avoiding over-stabilization is bypassed, and the shift is immediately commanded to the preferred operating range state. A "0" indicates that no immediate shift condition is detected and the flowchart 400 proceeds to decision block 408.

Decision block 408 determines if a change of mind condition is satisfied. The change of mind condition will not be detected or satisfied if it is determined that a transmission shift from a first operating range state to a second operating range state is not in progress. The first operating range state can correspond to a previously selected operating range state and the second operating range state can correspond to the previously desired operating range state. Determining if the change of mind condition is satisfied is discussed below in greater detail with reference to flowchart 500 of FIG. 5. A "0" indicates the change of mind condition is not satisfied and the flowchart proceeds to decision block 412. A "1" indicates the change of mind condition is satisfied and the flowchart proceeds to block 410.

Block 410 modifies an integration threshold by using a defined priority shift path only when the change of mind condition has been satisfied. In an exemplary embodiment, the integration threshold may be modified to a magnitude of near zero using a calibrateable threshold when the change of mind condition is satisfied, and thus, the shift is not determinative upon integrating cost for stabilization. As will be discussed in greater detail with reference to the flowchart 500 of FIG. 5, shifting in accordance with the defined priority shift path accomplishes execution of the shift to the preferred operating range state without the driver perceiving the shift while avoiding the requirement of integrating a cost differential associated with the preferred operating range state before allowing the shift only when the change of mind condition is satisfied.

Decision block 412 determines if an energy differential between the available operating range state and the previously desired operating range achieves an integration threshold. First, costs associated with operating the transmission in each of the available and previously desired operating range states are monitored. A cost differential between the monitored cost of the preferred operating range state and the previously desired operating range state is calculated. The cost differential is integrated and can be expressed as a cost differential between the preferred and previously desired operating range states over time. Integrating the cost differential can be expressed in accordance with the following relationship.

$$E_{dif} = \int P_{dif} dt \quad [1]$$

wherein $E_{dif}$ is the energy differential, and $P_{dif}$ is the cost differential.

Therefore, the energy loss differential is the cost differential between the preferred operating range state and the previously desired operating range states over time. In a non-limiting example, the $P_{dif}$ is expressed in kilowatts (kW) and the $E_{dif}$ is expressed in kilowatt-loops (kW-loops), wherein a loop is the loop rate of the controller. It will be appreciated that the $E_{dif}$ can be expressed in kilowatt-second (kW*sec), i.e., kilojoules (kJ) by scaling. A "1" indicates that the energy differential achieves the integration threshold and the flowchart proceeds to block 416. A "0" indicates that the energy differential does not achieve the integration threshold and the flowchart 400 reverts back to block 412. The integration threshold is respective to each individual operating state and the current clutch and engine states. In one embodiment, the energy differential can be normalized when divided by the integration threshold, wherein the integration threshold can be represented as a normalized threshold having a value of 1.

It will be appreciated that waiting until the integrated cost differential exceeds the integration threshold reduces shift business that would otherwise result every time a potential shift from a previously desired operating range state to a preferred operating range state is detected. Likewise, overstabilization in the previously desired operating range state is also avoided when a relatively small cost differential between the preferred and previously desired operating range states occurs over a long period of time.

Block 416 allows the shift from the previously desired operating range state to the preferred operating range state if the energy differential achieves the integration threshold. As aforementioned, the integration threshold is modified to a calibratable value near zero when the change of mind condition is satisfied (e.g., decision block 408).

Block 418 commands a shift to the preferred operating range state. The preferred operating range state can include the available operating range state if the energy differential achieves the integration threshold as discussed in decision block 412. However, if more than one available operating range states having a lower cost than the previously desired operating range state exist, an energy differential between each available operating range state and a maximum cost can be monitored. The magnitude of the maximum cost is selected to correspond to the cost of the previously desired operating range state and is utilized in the event the previously desired operating range state becomes unavailable as discussed above in decision block 406. Integration thresholds each associated with respective ones of the energy differentials can be monitored. Each of the energy differentials can be divided by respective ones of the integration thresholds and the energy differentials can be normalized based on the dividing. Subsequently one of the available operating range states associated with a normalized energy differential achieving a normalized threshold the quickest may be determined as the preferred operating range state, wherein the shift to that operating range state is commanded.

Figure 5:
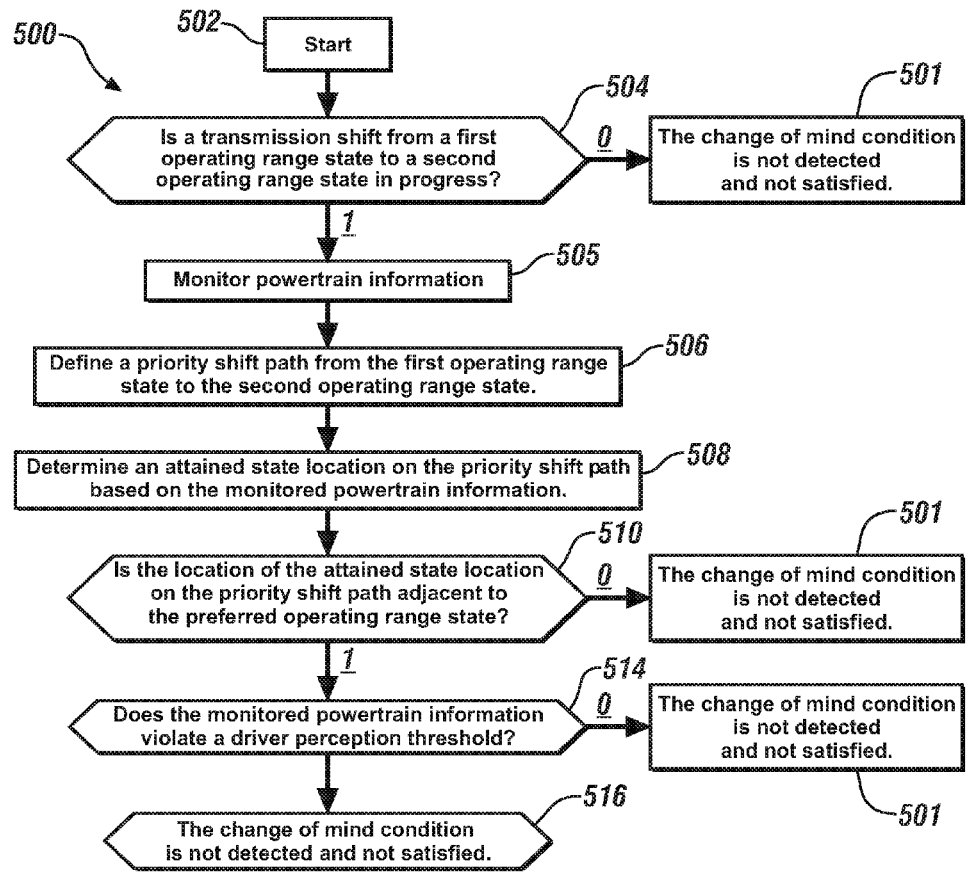
FIG. 5 illustrates a flowchart 500 for determining if a change of mind condition is satisfied in decision block 408 of flowchart 400 of FIG. 4, in accordance with the present disclosure.

FIG. 5 illustrates a flowchart 500 for determining if a change of mind condition is satisfied in decision block 408 described with reference to flowchart 400 of FIG. 4. When referring to the flowchart 500 of FIG. 5, a first operating range state corresponds to a previously selected operating range state; and a second operating range state corresponds to a previously desired operating range state. Table 3 is provided as a key to FIG. 5, wherein the numerically labeled blocks and the corresponding functions are set forth as follows.

TABLE 3

| BLOCK | BLOCK CONTENTS |
|---|---|
| 502 | Start |
| 504 | Is a transmission shift from a first operating range state to a second operating range state in progress? |
| 505 | Monitor powertrain information |
| 506 | Define a priority shift path from the first operating range state to the second operating range state. |
| 508 | Determine an attained state location on the priority shift path based on the monitored powertrain information. |
| 510 | Is the location of the attained state location on the priority shift path adjacent to the preferred operating range state? |
| 514 | Does the monitored powertrain information violate a driver perception threshold? |
| 516 | Determine the change of mind condition is satisfied. |
| 501 | The change of mind condition is not detected and not satisfied. |

The flowchart 500 starts at block 502 when the preferred operating range state of the transmission is requested as determined in block 402 of flowchart 400 illustrated in FIG. 4. As aforementioned, the preferred operating range state is determined as having a lower cost than a previously desired operating range state (e.g., second operating range state).

Decision block 504 determines if a shift from a first operating range state to a second operating range state is in progress. The phrase "in progress" correlates to the transition of the shift, including any intermediate operating range states, prior to achieving the second operating range state. A "0" indicates that no transmission shift from the first operating range state to the second operating range state is in progress and the flowchart 500 proceeds to block 501 determining that the change of mind condition is not satisfied, i.e., decision block 408 of flowchart 400 is denoted by a "0" determination. A "1" indicates that the transmission shift from the first operating range state to the second operating range state is in progress and the flowchart 500 proceeds to block 505.

Block 505 monitors powertrain information. The monitored powertrain information is provided as attained feedback from the powertrain and is selected from the group consisting of: an attained engine state, an attained engine speed and attained clutch states. Thus, the monitored powertrain information corresponds to an attained state location, wherein the attained state location is not an operating range state depicted in Table 1, but rather is attained feedback from the powertrain.

Blocks 506, 508 and 510 collectively determine if the change of mind condition is detected. At block 506, a priority shift path from the first operating range state to the second operating range state is defined. In an exemplary embodiment, the defined priority shift path can include only the first and second operating range states with no intermediate operating range states in between. In another exemplary embodiment, the defined priority shift path can include at least one intermediate operating range state in between the first and second operating range states. An actual operating range state on the priority shift path includes an operating range state that was most recently achieved during the shift. The actual operating range state can include the first operating range state or the intermediate operating range state. An immediate operating range state on the priority shift path includes an operating range state that will be achieved next during the shift. The immediate operating range state can include the intermediate operating range state and the second operating range state. It will be appreciated that the actual engine state always precedes the immediate engine state on the priority shift path during the shift from the first operating range state to the second operating range state. The intermediate operating range states can include the pseudo-gear ranges that are primarily employed as intermediate operating ranges during shifts between the EVT mode ranges depicted in Table 1. Accordingly, the defined priority shift path is unidirectional and depicts powertrain information along the shift path from the first operating range state to the second operating range state.

Block 508 determines an attained state location on the priority shift path based on the monitored powertrain information. In other words, block 508 monitors a location of attained powertrain information on the priority shift path. In an exemplary embodiment, an attained engine state and an attained engine speed is monitored when the actual operating range state includes one of an engine ON state and an engine OFF state and the immediate operating range state includes the other one of the engine ON state and the engine OFF state. The location of the attained engine state and the attained engine speed on the priority shift path is determined. In another exemplary embodiment, an attained engine speed is monitored when the actual operating range state includes one of an engine ON state and an engine OFF state and the immediate operating range state includes the same one of the engine ON state and the engine OFF state.

Decision block 510 determines if the location of the attained state location on the priority shift path is adjacent to the preferred operating range state. The attained state location on the priority shift path is adjacent to the preferred operating range state if the available operating range state includes one of the actual operating state and the immediate operating range state. In an exemplary embodiment, the preferred operating range state includes the first operating range state when the defined priority shift path does not include any intermediate operating range states located between the first operating range state and the second operating range state, provided that the preferred operating range state is located on the defined priority shift path. In another exemplary, the preferred operating range state includes one of the first operating range state and an intermediate range state when the defined priority shift path includes at least one intermediate operating range state located between the first and second operating range states, provided that the desired operating range state is located on the defined priority shift path. A "0" indicates that the attained state location on the priority shift path is not adjacent to the preferred operating range state and the flowchart proceeds to decision block 501. Hence, the preferred operating range state does not include one of the actual and intermediate operating range states on the priority shift path. It will be appreciated that if the preferred operating range state is not on the priority shift, the change of mind condition will not be detected, and thus, the change of mind condition is not satisfied, i.e., decision block 408 of flowchart 400 is denoted by a "0" determination. A "1" indicates the attained state location on the priority shift path is adjacent to the preferred operating range state and the flowchart proceeds to decision block 514. Hence, the preferred operating range state includes one of the actual and intermediate operating range states on the priority shift path. Accordingly, if the attained state location on the priority shift path is adjacent to the preferred operating range state, the change of mind condition is detected.

Decision block 514 determines if the monitored powertrain information violates a driver perception threshold. Specifically, decision block 514 compares the attained state location (e.g., attained powertrain information) to the driver perception threshold only if the attained powertrain information is adjacent to the preferred operating range state on the priority shift path and determines if the attained state location (e.g., attained powertrain information) on the defined priority shift path is downstream of the driver perception threshold.

In an exemplary embodiment, the driver perception threshold includes an acceptable engine state and engine speed allowing a transmission shift to the preferred operating range state that would not be perceivable to the driver when the actual operating range state includes one of an engine ON state and an engine OFF state and the immediate operating range state includes the other one of the engine ON state and the engine OFF state. Such driver perception thresholds can be established and quantified during vehicle calibration through objective criteria, subjective criteria, and combinations thereof in manners well known to those having ordinary skill in the art. A "0" indicates that the attained powertrain information does not violate the driver perception threshold. In other words, a "0" indicates that a shift to the preferred operating range state would not be perceivable to the driver if the attained powertrain information (e.g., attained engine state and attained engine speed) on the priority shift path is upstream from the driver perception threshold. Accordingly, the flowchart proceeds to block 516 determining the change of mind condition is satisfied. A "1" indicates that the attained powertrain information violates the driver perception threshold. In other words, a "1" indicates that a shift to the preferred operating range state would be perceivable to the driver if the attained powertrain information (e.g., attained engine state and attained engine speed) on the priority shift path is downstream from the driver perception threshold. Accordingly, the flowchart 500 proceeds to block 501 determining that the change of mind condition is not satisfied, i.e., decision block 408 of flowchart 400 is denoted by a "0" determination.

In another exemplary embodiment, the driver perception threshold includes an acceptable engine speed allowing a transmission shift to the preferred operating range state that would not be perceivable to the driver when the actual operating range state includes one of the engine ON state and the engine OFF state and the intermediate operating range state includes the same one of the engine ON state and the engine OFF state. A "0" indicates that a shift to the preferred operating range state would not be perceivable to the driver if the attained powertrain information (e.g., attained engine speed) on the priority shift path is upstream from the driver perception threshold. Accordingly, the flowchart proceeds to block 516 determining the change of mind condition is satisfied. A "1" indicates that a shift to the preferred operating range state would be perceivable to the driver if the attained powertrain information (e.g., attained engine speed) on the priority shift path is downstream from the driver perception threshold. Accordingly, the flowchart 500 proceeds to block 501 determining that the change of mind condition is not satisfied, i.e., decision block 408 of flowchart 400 is denoted by a "0" determination.

Block 501 determines that the change of mind condition is not satisfied, i.e., decision block 408 of flowchart 400 is denoted by a "0" determination. The state of mind condition is never satisfied when the state of mind condition is not detected. The state of mind condition is not detected when the attained state location is not adjacent to the preferred operating range state. As aforementioned, the attained state location is not adjacent to the preferred operating range state when the preferred operating range state does not include the actual operating range state or the immediate operating range state. The change of mind condition is not detected when the preferred operating range state is not located on the priority shift path. Further, the change of mind condition is not satisfied when the attained powertrain information violates the driver perception threshold, i.e., the location of the attained powertrain information on the priority shift path is downstream from the desired operating range state. Accordingly, block 501 will result in keeping the command of the shift to the second operating range state and only subsequently commanding a transmission shift to the preferred operating range state if the energy differential achieves the integration threshold (i.e., decision block 412 is "1").

Block 516 determines the change of mind condition is satisfied, i.e., decision block 408 of flowchart 400 is denoted by a "1" determination. Accordingly, the integration threshold will be modified to a calibrateable value near zero and the flowchart will eventually proceed to block 416 without applying integration to the cost difference. Commanding the shift to the second operating range state will be avoided and the shift to the preferred operating range state will be commanded.

Figure 6:
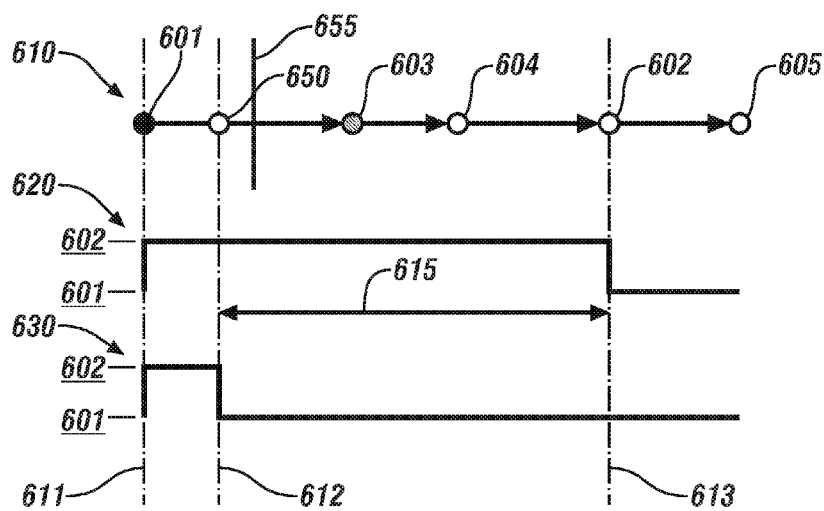
FIG. 6 illustrates an example of a satisfied change of mind condition including a first plot 610 depicting a unidirectional priority shift path, a second plot 620 depicting a commanded operating range state without considering the change of mind condition, and a third plot 630 depicting the commanded operating range state when the change of mind condition is satisfied, in accordance with the present disclosure.

FIG. 6 illustrates an example of a satisfied change of mind condition including a first plot 610 depicting a unidirectional priority shift path, a second plot 620 depicting a commanded operating range state without considering the change of mind condition and a third plot 630 depicting the commanded operating range state when the change of mind condition is satisfied, in accordance with the present disclosure. Referring to plot 610, the unidirectional priority shift path is defined from a first operating range state 601 to a second operating range state 602. The defined unidirectional priority shift path includes a first intermediate operating range state 603 and a second intermediate operating range state 604. A third operating range state 605 is depicted but is not located on the defined unidirectional priority shift path.

At dashed vertical line 611 extending through each of plots 610, 620, 630 a shift from the first operating range state 601 to the second operating range state 602 is commanded. For instance, the driver tipped into an accelerator pedal and the second operating range state is desired in response there to. However, at dashed vertical line 612 extending through each of plots 610, 620, 630, a determination is made that suddenly the first operating range state 601 now has the lowest cost associated operating the transmission while the shift from the first operating range state 601 to the second operating range state 602 is in progress. For instance, the driver has decided to tip out of the previous input to the accelerator pedal at dashed vertical line 611. It will be appreciated that the first operating range state 601 is now a preferred operating range state and the second operating range state was a previously desired operating range state at dashed vertical line 612.

Referring to plot 620, once the shift to the second operating range state 602 is commanded at dashed vertical line 611, the shift is executed until the shift to the second operating range state 602 is completed at dashed vertical line 613. Hence, immediately commanding a shift to the first operating range state 601 is not considered at dashed vertical line 612 even though the first operating range state is now suddenly preferred. In other words, after the shift to the second operating range state is completed, the shift to the first operating range state (i.e., preferred operating range state) 601 can only be subsequently commanded once the energy differential between the first and second operating range states achieves the integration threshold (e.g., see block 412 of FIG. 5). Accordingly, over-stabilization 615 is present between dashed vertical lines 612 and 613.

Referring to plot 630, when the change of mind condition is satisfied, the shift to the first operating range state 601 (e.g., preferred operating range state) is commanded and the transmission shift to the second operating range state 602 (e.g., previously desired operating range state) is avoided at dashed vertical line 612. Referring to plot 610, an attained state location 650 on the priority shift path is determined based on monitoring attained powertrain information. The attained state location 650 is not an operating range state. It will be appreciated that the powertrain is still currently operating in the first operating range state 601 until the first intermediate operating range state 603 is achieved, and therefore, the first operating range state can be referred to as an actual operating range state. The first intermediate operating range state 603 can be referred to as an immediate operating range state because it is the next operating range state to be reached during the shift from the first operating range state 601 to the second operating range state 602 along the unidirectional priority shift path depicted in plot 610. The actual operating range state (e.g., first operating range state 601) and the immediate operating range state (e.g., first intermediate operating range state 603) are adjacent to the attained state location. Therefore, the actual operating range state and the immediate operating range state are change of mind candidates. A change of mind condition is detected because the attained state location 650 on the priority shift path is adjacent to the preferred operating range state, i.e., the first operating range state 601 or actual operating range state. Further, the attained state location 650 is upstream from a driver perception threshold 655, satisfying the change of mind condition. Thus, because the attained state location 650 is upstream from the driver perception threshold, an immediate shift to the first operating range state 601 would not be perceivable to the driver. Accordingly, over-stabilization 615 resulting while the shift to the second operating range state 602 is in progress is avoided and the shift to the first operating range state 601 is commanded without being perceived by the driver when implementing a satisfied change of mind condition.

Figure 7:
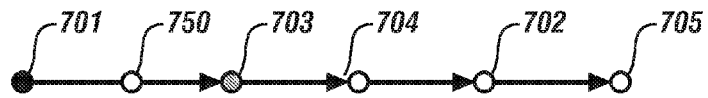
FIG. 7 illustrates an exemplary plot depicting change of mind candidates located on a priority shift path from a first operating range state 701 to a second operating range state 702, in accordance with the present disclosure.

FIG. 7 illustrates an exemplary plot 700 depicting change of mind candidates located on a priority shift path from a first operating range state 701 to a second operating range state 702, in accordance with the present disclosure. The priority shift path is unidirectional starting at 701 and ending at 702. A third operating range state 705 is not included on the priority shift path. A first intermediate operating range state 703 and a second intermediate operating range state 704 are included on the priority shift path. An attained state location 750 on the priority shift path is depicted. The attained state location can correlate to an attained clutch state and an attained engine state in one embodiment. The first operating range state 701 is an actual operating range state and the first intermediate operating range state 703 is an immediate operating range state. Accordingly, each of the first operating range state 701 and the first intermediate operating range state 703 are adjacent to the attained state location 750, and thus, are change of mind candidates. The second intermediate operating range state 704 is not currently a change of mind candidate. However, as the attained state location 750 proceeds in accordance with the unidirectional priority shift path, the second intermediate operating range state 704 will become adjacent to the current state location rendering 704 as an object candidate. The third operating range state will never be an object candidate because it is not located on the priority shift path. In other words, if the third operating range state 705 never becomes a preferred operating range state while the shift to the second operating range state 702 is in progress, it will have to satisfy block 412 if FIG. 4.

Figure 8:
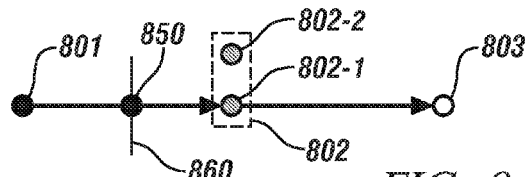
FIG. 8 illustrates and exemplary plot depicting change of mind candidates located on a priority shift path from a first operating range state 801 to a second operating range state 803, in accordance with the present disclosure.

FIG. 8 illustrates an exemplary plot depicting change of mind candidates located on a priority shift path from a first operating range state 801 to a second operating range state 803. The first operating range state 801 includes an engine OFF state and the second operating range state 803 includes an engine ON state. An intermediate operating range state 802-1 is located between the first and second operating range states 801, 803, respectively. The intermediate operating range state 802-1 includes an engine ON state. An attained state location 850 is depicted on the priority shift path and correlates to an attained engine state and an attained engine speed. The first operating range state 701 is an actual operating range state and the intermediate operating range state 703 is an immediate operating range state. Thus, progression of the shift from the first operating range state 801 (e.g., actual operating range state) to the intermediate operating range state 802-1 (e.g., immediate operating range state) includes an engine state change from OFF to ON, respectively. Further, the first operating range state 801 and the intermediate operating range state 802-1 are adjacent to the attained state location 850, and thus, are change of mind candidates. Superset 802 includes the intermediate operating range state 802-1 and a third operating range state 802-2. The third operating range state 802-2 includes a cylinder deactivation state. However, because the third operating range state 802-2 is included as a superset along with the intermediate operating range state 802-1, the third operating range state 802-2 is qualified as a change of mind candidate. A driver perception threshold 860 is depicted and describes an acceptable engine state and engine speed that would not be perceivable to the driver if a shift to the first operating range state 801 is commanded while a shift from the first operating range state 801 to the second operating range state 803 is in progress. Hence if the attained state location 850 is upstream from the driver perception threshold 860, the shift from the first operating range state 801 to the second operating range state 803 will be avoided and a shift to the first operating range state 801 using the priority shift path will be commanded if the first operating range state 801 suddenly becomes preferred. Likewise, if the third operating range state 802-2 including the cylinder deactivation state suddenly becomes preferred as a preferred operating range state during a shift from the first to the second operating range state 801, 803, respectively, a shift to the second operating range state 803 can be avoided and a shift to the third operating range state 802-2 can be commanded using the priority shift path so long as the change of mind condition is satisfied.

Figure 9:
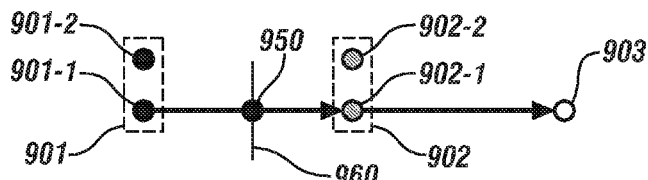
FIG. 9 illustrates and exemplary plot depicting change of mind candidates located on a priority shift path from a first operating range state 901-1 to a second operating range state 903, in accordance with the present disclosure.

FIG. 9 illustrates and exemplary plot depicting change of mind candidates located on a priority shift path from a first operating range state 901-1 to a second operating range state 903, in accordance with the present disclosure. A first superset 901 includes the first operating range state 901-1 and a third operating range state 901-2. The first operating range state 901-1 includes a first mode engine ON state and the third operating range state 901-2 includes a first mode cylinder deactivation state. A second superset 902 includes an intermediate operating range state 902-1 and a fourth operating range state 902-4. The intermediate operating range state 902-1 includes a second mode engine ON state and the fourth operating range state 902-2 includes a second mode cylinder deactivation state. Accordingly, an attained state location 950 only includes engine speed. The first operating range state 901-1 is an actual operating range state and the intermediate operating range state 902-1 is an immediate operating range state. Thus, progression of the shift from the first operating range state 901-1 (e.g., actual operating range state) to the intermediate operating range state 902-1 (e.g., immediate operating range state) does not include an engine state change because the engine state is always ON. A driver perception threshold is depicted, and describes an acceptable engine speed allowing a shift to one of the operating range states of the first superset 901 that would not be perceivable to the driver. Hence, if the attained state location 950 is upstream from the driver perception threshold 960, a shift from the first operating range state 901-1 to the second operating range 903 state will be avoided and a shift to the third operating range state 901-2 using the priority shift path will be commanded if the third operating range state 901-2 including the first mode cylinder deactivation state suddenly becomes the preferred operating range state. Likewise, if the fourth operating range state 902-2 including the second mode cylinder deactivation state suddenly becomes the preferred operating range state during a shift from the first to the second operating range state 901-1, 903, respectively, a shift to the fourth operating range state 902-2 can be commanded and the shift to the second operating range state 903 can be avoided using the priority shift path so long as the change of mind condition is satisfied.

Figure 10:
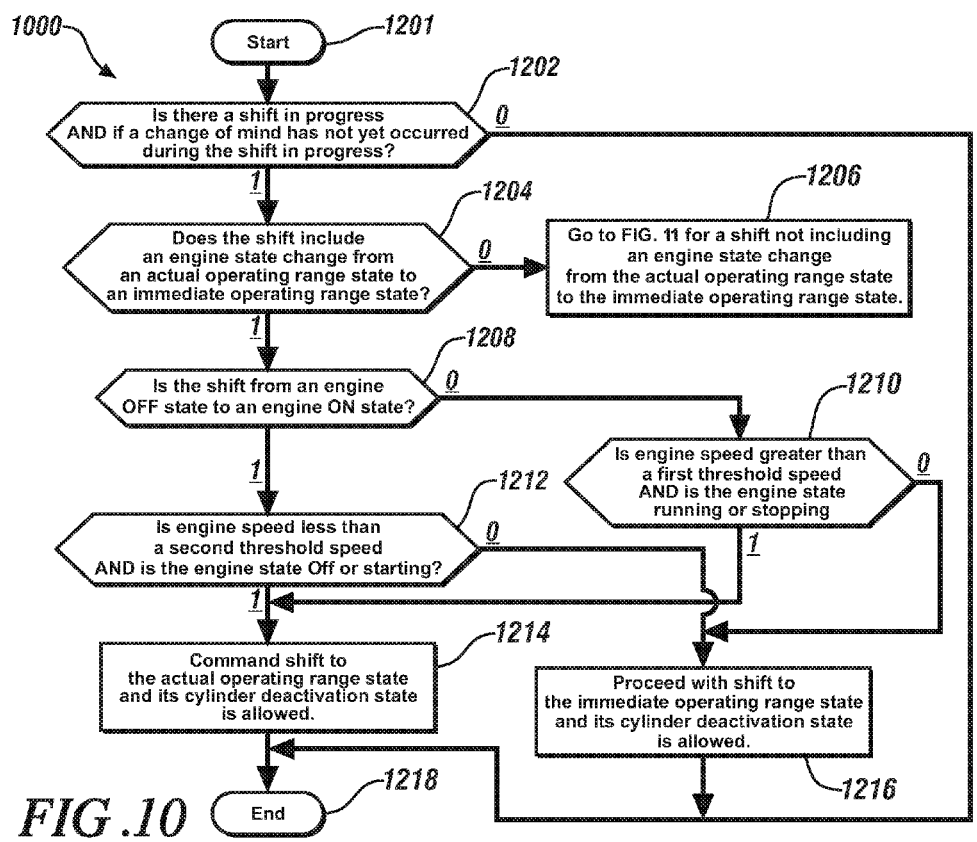
FIG. 10 illustrates a flowchart 1000 for selecting an operating range state when a shift between engine states is in progress and a change of mind condition is detected of flowchart 400 of FIG. 4, in accordance with the present disclosure.

FIG. 10 illustrates a flowchart 1000 for selecting an operating range state when a shift between engine states is in progress and a change of mind condition is detected described with reference to flowchart 400 of FIG. 4, in accordance with the present disclosure. Table 4 is provided as a key to FIG. 10, wherein the numerically labeled blocks and the corresponding functions are set forth as follows.

TABLE 4

Figure 11:
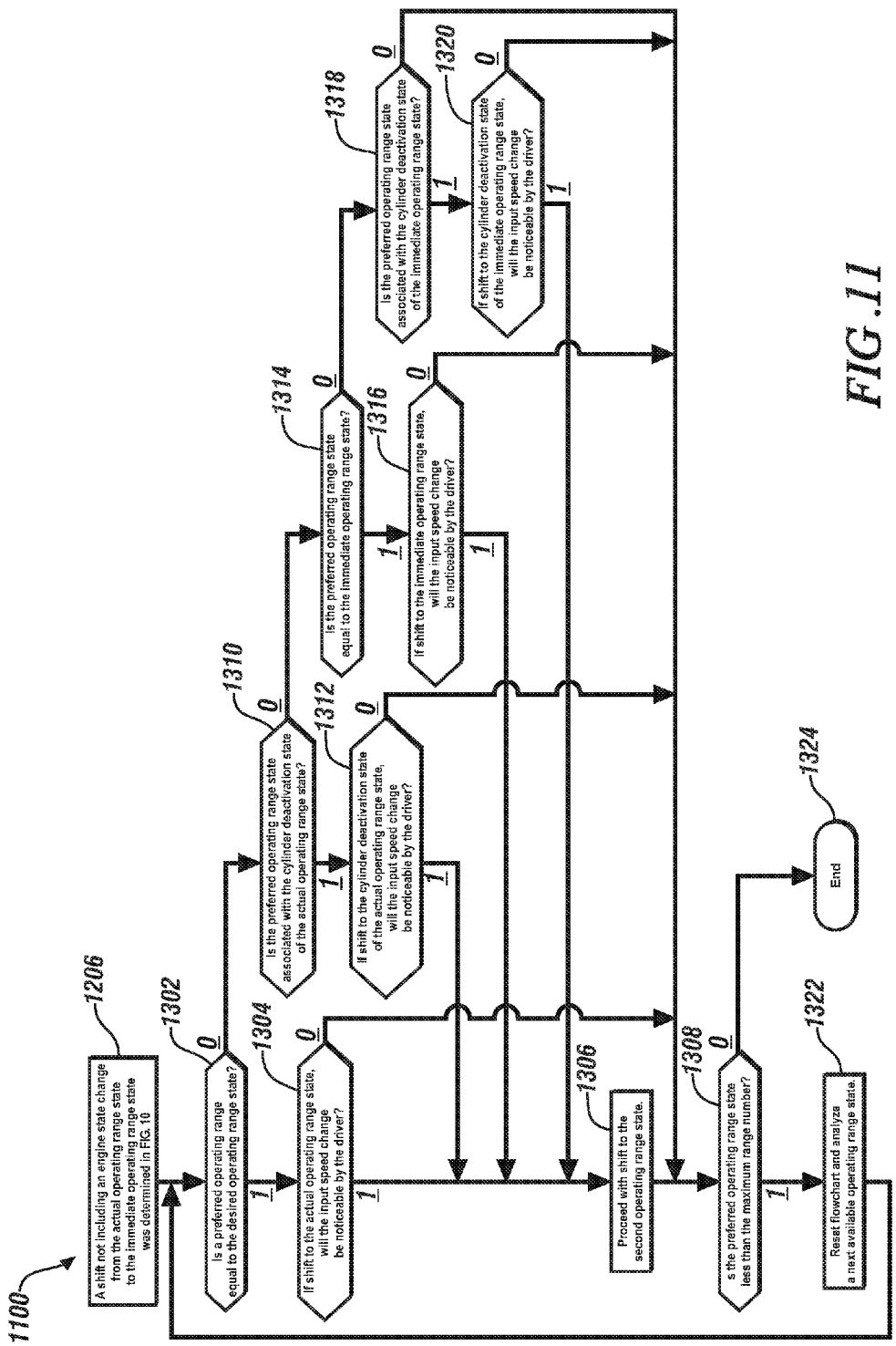
FIG. 11 illustrates a flowchart 1100 for selecting an operating range state when decision block 1204 of FIG. 10 determines the shift does not include an engine state change of flowchart 400 of FIG. 4, in accordance with the present disclosure.

| BLOCK | BLOCK CONTENTS |
|---|---|
| 1201 | Start |
| 1202 | Is there a shift in progress AND if a change of mind has not yet occurred during the shift in progress? |
| 1204 | Does the shift include an engine state change from an actual operating range state to an immediate operating range state? |
| 1206 | Go to FIG. 11 for a shift not including an engine state change from the actual operating range state to the immediate operating range state. |
| 1208 | Is the shift from an engine OFF state to an engine ON state? |
| 1210 | Is engine speed greater than a first threshold speed AND is the engine state running or stopping? |
| 1212 | Is engine speed less than a second threshold speed AND is the engine state Off or starting? |
| 1214 | Command shift to the actual operating range state and its cylinder deactivation state is allowed. |
| 1216 | Proceed with shift to the immediate operating range state and its cylinder deactivation state is allowed. |
| 1218 | End |

The flowchart 1000 starts at block 1201 and proceeds to decision block 1202 to determine if a shift is in progress AND if a change in mind has not yet occurred during the shift in progress. A shift in progress includes a shift from a first operating range state to a second operating range state, wherein an operating range state having a lower cost than the second operating range state suddenly becomes preferred while the shift is in progress. A "0" indicates at least one of a shift is not in progress or a change of mind has occurred if a shift is in progress. The flowchart 1000 proceeds to block 1218 and is ended. A "1" indicates that there is a shift in progress AND a change in mind has not yet occurred during the shift in progress. The flowchart 1000 proceeds to decision block 1204.

Decision block 1204 determines if the shift includes an engine state change from an actual operating range state to an immediate operating range state. Actual and immediate operating range states are discussed above with reference to decision block 510 of FIG. 5. A "0" indicates the shift does not include an engine state change and proceeds to block 1206, described with reference to flowchart 1100 of FIG. 11. A "1" indicates the shift includes an engine state change and proceeds to decision block 1208.

Decision block 1208 determines if the shift from the actual operating range state to the immediate operating range state is from an engine OFF state to an engine ON state. A "0" indicates that the shift is not from an engine OFF state to an engine ON state and proceeds to decision block 1210. A "1" indicates that the shift is from an engine OFF state to an engine ON state and proceeds to decision block 1212.

Decision block 1210 determines if engine speed is greater than a first threshold speed AND the if the engine state is either running or stopping. A "0" indicates that either the engine speed is not greater than the first threshold speed or the engine state is not running or stopping and proceeds to block 1216. A "1" indicates the engine speed is greater than the first threshold speed AND the engine state is either running or stopping and proceeds to block 1214.

Decision block 1212 determines if engine speed is less than a second threshold speed AND the engine state is either OFF or starting. A "0" indicates that either the engine speed is not less than second threshold speed or the engine state is not OFF or starting and proceeds to block 1216. A "1" indicates the engine speed is less than the second threshold speed AND the engine state is either OFF or starting and proceeds to block 1214.

Block 1214 commands a shift to the actual operating range state and a cylinder deactivation state associated with the actual operating range state will be allowed when the actual operating range state is an available operating range state having a lower cost than the second or previously desired operating range state.

Block 1216 proceeds with a shift to the immediate operating range state (e.g., previously desired operating range state) and a cylinder deactivation state associated with the immediate operating range state is allowed when the immediate operating range state is a preferred operating range state having a lower cost than the second or previously desired operating range state.

FIG. 11 illustrates a flowchart 1100 for selecting an operating range state when decision block 1204 of FIG. 10 determines the shift does not include an engine state change described with reference to flowchart 400 of FIG. 4, in accordance with the present disclosure. Table 4 is provided as a key to FIG. 10, wherein the numerically labeled blocks and the corresponding functions are set forth as follows.

TABLE 3

| BLOCK | BLOCK CONTENTS |
|---|---|
| 1206 | A shift not including an engine state change from the actual operating range state to the immediate operating range state was determined in FIG. 10 |
| 1302 | Is a preferred operating range equal to the desired operating range state? |
| 1304 | If shift to the actual operating range state, will the input speed change be noticeable by the driver? |
| 1306 | Proceed with shift to the second operating range state. |
| 1308 | Is the preferred operating range state less than the maximum range number? |
| 1310 | Is the preferred operating range state associated with the cylinder deactivation state of the actual operating range state? |
| 1312 | If shift to the cylinder deactivation state of the actual operating range state, will the input speed change be noticeable by the driver? |
| 1314 | Is the preferred operating range state equal to the immediate operating range state? |
| 1316 | If shift to the immediate operating range state, will the input speed change be noticeable by the driver? |
| 1318 | Is the preferred operating range state associated with the cylinder deactivation state of the immediate operating range state? |
| 1320 | If shift to the cylinder deactivation state of the immediate operating range state, will the input speed change be noticeable by the driver? |
| 1322 | Reset flowchart and analyze a next available operating range state. |
| 1324 | End |

Flowchart 1100 begins from block 1206 of flowchart 1000. The flowchart 1100 proceeds from block 1206 to decision block 1302 where it is determined whether the preferred operating range state is equal the actual operating range state. A "0" indicates the preferred operating range state is not equal to the actual operating range state and proceeds to decision block 1310. A "1" indicates the available operating range state is equal to the actual operating range state and proceeds to decision block 1304.

Decision block 1304 determines if an input speed change will be noticeable by the driver if a shift to the actual operating range state occurs. For the purposes of this disclosure, input speed changes are determined noticeable in accordance with driver perception thresholds which can be established and quantified during vehicle calibration through objective criteria, subjective criteria, and combinations thereof in manners well known to those having ordinary skill in the art. A "0" indicates the input speed change will not be noticeable by the driver and the flowchart 1100 proceeds to decision block 1308. A "1" indicates the input speed change will be noticeable by the driver and the flowchart 1100 proceeds to block 1306.

Decision block 1310 determines if the preferred operating range state is associated with a cylinder deactivation state of the actual operating range state. A "0" indicates the preferred operating range state is not associated with the cylinder deactivation state of the actual operating range state and the flowchart 1100 proceeds to decision block 1314. A "1" indicates the preferred operating range state is associated with the cylinder deactivation state of the actual operating state and the flowchart 1100 proceeds to decision block 1312.

Decision block 1312 determines if the input speed change will be noticeable by the driver if a shift to the cylinder deactivation state of the actual operating range state occurs. A "0" indicates that the input speed change will not be noticeable by the driver and the flowchart 1100 proceeds to decision block 1308. A "1" indicates that the input speed change will be noticeable by the driver and the flowchart 1100 proceeds to block 1306.

Decision block 1314 determines if the preferred operating range state is equal to immediate operating range state. The immediate operating range state is non-limiting in this example, and can include the final second operating range state or an intermediate operating range state depending on the attained state location (e.g., monitored powertrain information). A "0" indicates the preferred operating range state is not equal to the immediate operating range state and the flowchart 1100 proceeds to decision block 1318. A "1" indicates that the preferred operating range state is equal to the immediate operating range state and the flowchart 1100 proceeds to decision block 1316.

Decision block 1316 determines if the input speed change will be noticeable by the driver if a transition to the immediate operate range state occurs. A "0" indicates that the input speed change will not be noticeable by the driver and the flowchart proceeds to decision block 308. A "1" indicates that the input speed change will be noticeable by the driver and the flowchart proceeds to block 306.

Decision block 1318 determines if the preferred operating range state is associated with a cylinder deactivation state of the immediate operating range state. A "0" indicates that the preferred operating range state is not associated with a cylinder deactivation state of the immediate operating range state and the flowchart proceeds to decision block 1308. A "1" indicates that the preferred operating range state is associated with a cylinder deactivation state of the immediate operating range state and the flowchart proceeds to decision block 1320.

Decision block 1320 determines if an input speed change will be noticeable by the driver if a shift to the cylinder deactivation state of the immediate operating range state occurs. A "0" indicates that the input speed change will not be noticeable by the driver and the flowchart 300 proceeds to decision block 1308. A "1" indicates that the input speed change will be noticeable by the driver and the flowchart 1100 proceeds to block 1306. Block 1306 proceeds with the shift to the second preferred operating range state, e.g., the previously desired operating range state.

Decision block 1308 determines if a plurality of operating range states deemed available is less than a maximum range number. A "0" indicates the plurality of available operating range states is not less than the maximum range number and the flowchart 300 proceeds to block 1324, wherein the flowchart 1100 is ended. A "1" indicates the plurality of available operating range states is less than the maximum range number and the flowchart 1100 proceeds to block 1322. Block 1322 resets flowchart 1100 and analyzes a next available operating range state.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for stabilizing selection between a plurality of operating range states of an electro-mechanical multi-mode transmission configured to transfer torque among an engine, at least one electric machine, and a driveline, the method comprising:
 a control module configured to execute the following steps, comprising:
  requesting operation of the electro-mechanical multi-mode transmission in a preferred operating range state while a shift from a first operating range state to a second operating range state is in progress prior to achieving the second operating range state;
  monitoring powertrain information;
  comparing the powertrain information to a driver perception threshold only if a change of mind condition is detected; and
  avoiding the shift to the second operating range state and commanding a shift to the preferred operating range state if the powertrain information does not violate the driver perception threshold;
 wherein the driver perception threshold comprises at least an acceptable engine speed allowing a transmission shift to the preferred operating range state that would not be perceivable to the driver;
 wherein the change of mind condition includes a condition when the requested preferred operating range state is adjacent to the monitored powertrain information along a defined priority shift path from the first operating range state to the second operating range state.

2. The method of claim 1 wherein requesting operation of the transmission in the preferred operating range state comprises:
 determining as the preferred operating range state an operating range state having a lower cost associated with operating the transmission than the second operating range state; and
 requesting operation of the transmission in the preferred operating range state.

3. The method of claim 1 wherein detecting the change of mind condition comprises:
 defining the priority shift path from the first operating range state to the second operating range state;
 determining an attained state location on the priority shift path based on the monitored powertrain information;
 monitoring change of mind candidates adjacent to the attained state location on the priority shift path including an actual operating range state and an immediate operating range state, said actual operating range state comprising an operating range state most recently achieved during the shift from the first operating range state to the second operating range state and said immediate operating range state comprising an operating range state that will subsequently be achieved during the shift from the first operating range state to the second operating range state; and detecting the change of mind condition only if the preferred operating range state comprises one of the actual and immediate operating range states.

4. The method of claim 3 further comprising:
 determining the change of mind condition is not detected if the preferred operating range state does not comprise one of the actual and immediate operating range states.

5. The method of claim 3 further comprising:
 when the preferred operating range state is located on the priority shift path, the desired operating range state comprises the first operating range state when the defined priority shift path does not include any intermediate operating range states located between the first operating range state and the second operating range state.

6. The method of claim 3 further comprising:
 when the desired operating range state is located on the priority shift path, the preferred operating range state comprises one of the first operating range state and an intermediate operating range state when the defined priority shift path includes at least one intermediate operating range state located between the first operating range state and the second operating range state.

7. The method of claim 1 further comprising:
 completing the shift to the second operating range state if one of:
  the state of mind condition is not detected, and
  the monitored powertrain information violates the driver perception threshold.

8. The method of claim 7 wherein completing the shift to the second operating range state further comprises subsequently commanding a shift to the preferred operating range state, comprising:
 monitoring costs associated with operating the transmission in each of the second and the preferred operating range states;
 determining an energy differential between the second and the preferred operating range states based on the monitored costs; and
 commanding the shift from the second operating range state to the preferred operating range state only if the energy differential achieves a respective integration threshold.

9. The method of claim 8 wherein the energy differential is normalized when divided by the respective integration threshold.

10. The method of claim 1 wherein the monitored powertrain information is selected from the group consisting of: an attained engine state, an attained engine speed, and attained clutch states.

11. The method of claim 1 wherein comparing the powertrain information to the driver perception threshold only if the change of mind condition is detected comprises:
 monitoring an actual operating range state on the defined priority shift path comprising an operating range state that was most recently achieved during the shift from the first operating range state to the second operating range state;
 determining the actual operating range state comprises one of an engine ON state and an engine OFF state;
 monitoring an immediate operating range state on the defined priority shift path comprising an operating range state achieved next during the shift from the first operating range state to the second operating range state; and
 determining if the immediate operating range state comprises one of the engine ON state and the engine OFF state.

12. The method of claim 1 wherein the driver perception threshold comprises one of:

an acceptable engine state and engine speed allowing a transmission shift to the preferred operating range state that would not be perceivable to the driver when the actual operating range state comprises one of the engine ON state and the engine OFF state and the immediate operating range state comprises the other one of the engine ON state and the engine OFF state; and an acceptable engine speed allowing a transmission shift to the preferred operating range state that would not be perceivable to the driver when the actual operating range state comprises one of the engine ON state and the engine OFF state and the second operating range state comprises the same one of the engine ON state and the engine OFF state.

* * * * *